March 13, 1934.  W. G. RETZLAFF ET AL  1,951,258

TRAILER

Filed July 14, 1932    2 Sheets-Sheet 1

Inventors
Walter G. Retzlaff &
Howard A. Flogaus

By Blackmore, Spencer & Flint
Attorneys

March 13, 1934. W. G. RETZLAFF ET AL 1,951,258
TRAILER
Filed July 14, 1932   2 Sheets-Sheet 2
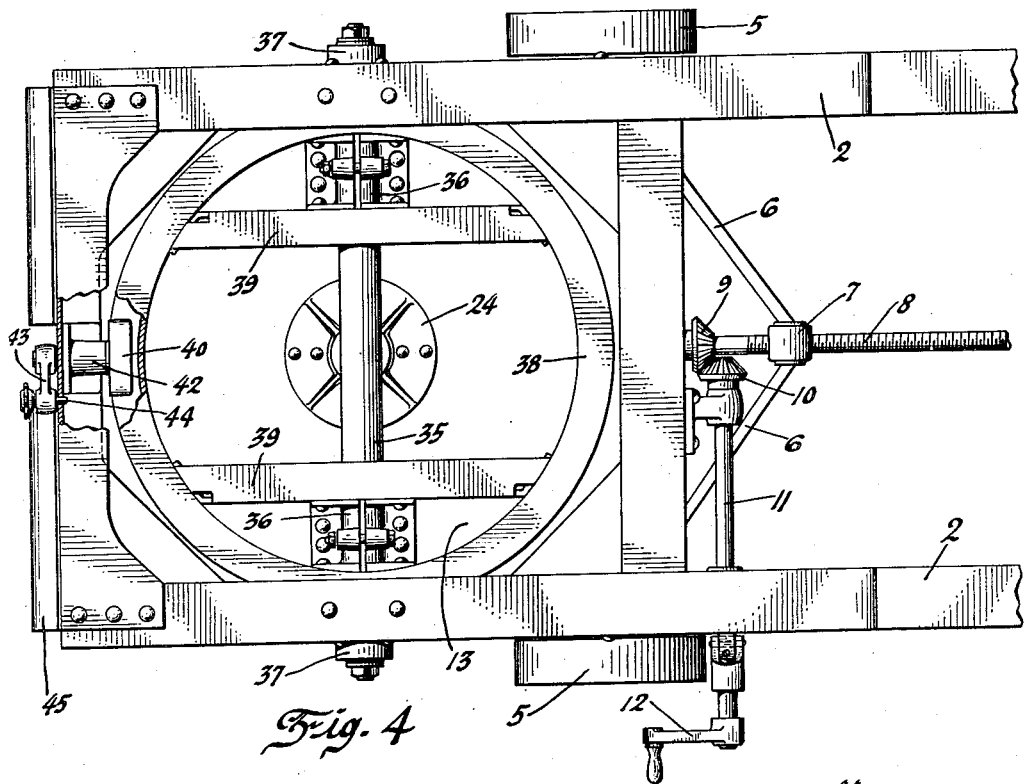
Fig. 4
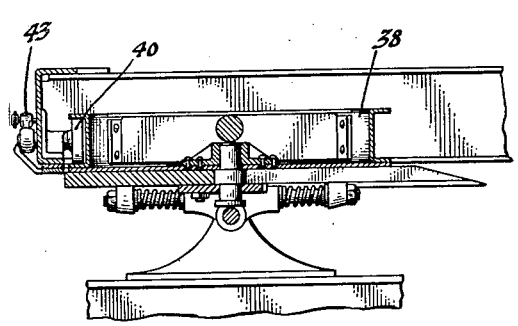
Fig. 7
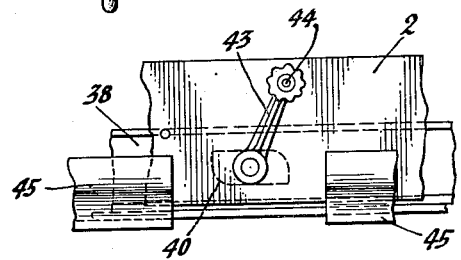
Fig. 5
Fig. 6
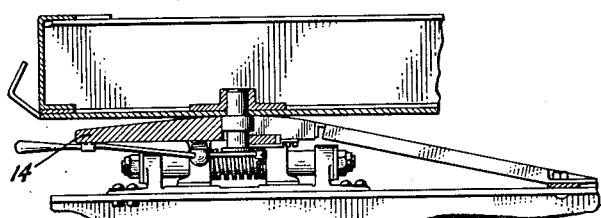
Fig. 8
Inventors
Walter G. Retzlaff &
Howard A. Flogaus.
By Blackmore, Spencer & Flint
Attorney Patented Mar. 13, 1934

1,951,258

UNITED STATES PATENT OFFICE 1,951,258

TRAILER

Walter G. Retzlaff, Detroit, and Howard A. Flogaus, Ferndale, Mich., assignors, by mesne assignments, to Yellow Truck & Coach Manufacturing Company, Pontiac, Mich., a corporation of Maine Application July 14, 1932, Serial No. 622,416

7 Claims. (Cl. 280—33.1)

This invention relates to road vehicles that form an articulated train of the type sometimes referred to as a tractor semi-trailer combination. The usual combination involves in effect, a six wheel vehicle in which the load is placed in a unit supported at the rear upon a pair of trailing wheels and at the front upon the rear of a four wheeled tractor or truck which includes the power plant and conventional automotive driving mechanism. To afford short turning radius, the tractor and trailer are interconnected for relative movement about a vertical axis, and, to accommodate irregularities in the road surface and abrupt changes in grade, provision is also made for relative movement about a transverse horizontal axis. The interconnection is also made detachable so that a given tractor unit may be used with different trailer units and vice versa, whereby the motive or power unit can be placed in almost constant hauling service and during the time the load containing units are being loaded and unloaded.

An object of the present invention is to provide an improved fifth wheel or turn table coupling between the tractor and semi-trailer, in which the upper and lower bearing elements are each of simple and inexpensive design and capable of use not only with each other but with other types of well known constructions already on the market.

Figure 1:
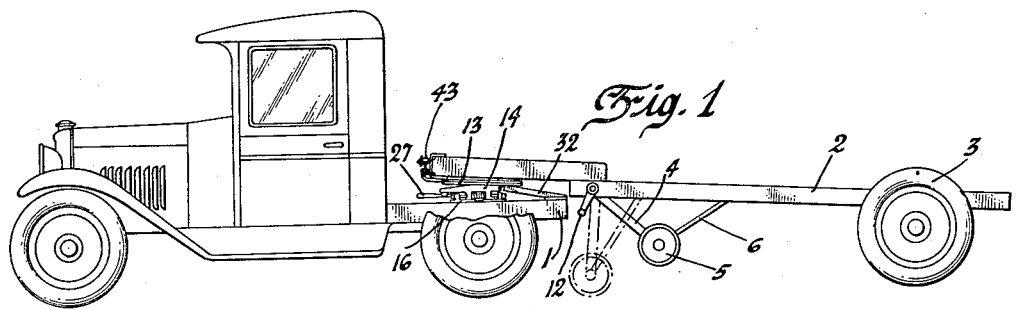
Figure 2:
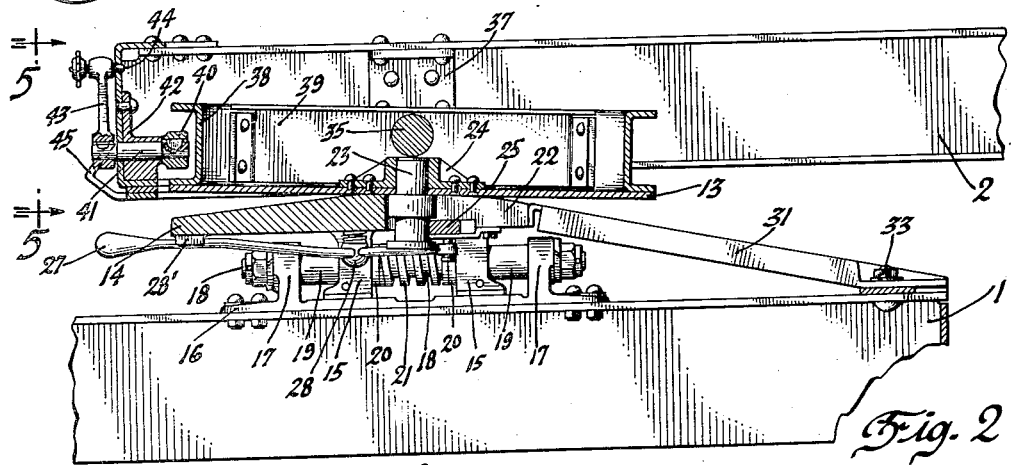
Figure 3:
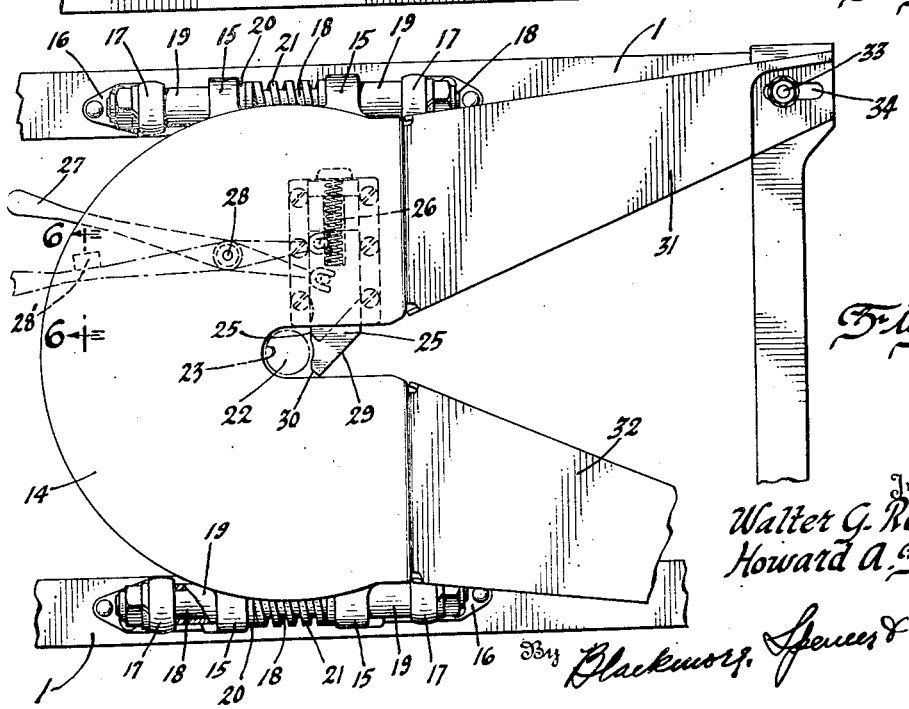

This and other objects of the invention will become apparent from the following detailed specification when taken in connection with the accompanying drawings, wherein Figure 1 is a side elevation of a tractor semi-trailer combination; Figure 2 is a longitudinal sectional view on an enlarged scale of the turn table connection; Figures 3 and 4 are top plan views of the lower and upper bearing elements, respectively; Figure 5 is a front elevation of the trailer frame looking in the direction of the arrows on line 5—5 of Figure 2; Figure 6 is a detail section taken on line 6—6 of Figure 3, and Figures 7 and 8 are sectional views illustrating the interchangeability provided by the present construction and the coupling of the respective bearing elements with complementary bearing devices of a type in general use.

Referring to the drawings, the numeral 1 indicates a tractor unit and 2 a trailer unit. The trailer unit is provided at its rear end with a pair of road wheels 3 and adjacent its front with a retractible landing gear for use in holding the front end elevated when the parts are uncoupled. As shown in the drawing, the landing gear comprises a swinging leg 4 at each side of the trailer frame, having a wheel 5 at its lower end and connected by a link 6 with a traveling nut or block 7, see Figure 4. To raise or lower the props 4, the block 7 is movable longitudinally by means of a screw shaft 8, having suitable bearings in the frame and carrying a conical gear 9 in mesh with a mating gear 10 on a laterally extending shaft 11 adapted for rotation, by means of a hand lever 12 at the side of the frame.

Forward of the landing gear, and on the underside of the trailer frame, is a hinged or tilting fifth wheel 13 resting upon a non-tilting lower fifth wheel 14 carried by the tractor and provided with a convex upper surface. The bearing element 14 has at each side a pair of spaced feet 15 which are slidable longitudinally upon and supported by a frame bracket 16. To locate the feet and to cushion the movement thereof, each bracket 16 is provided with a pair of spaced bosses 17 by which a shaft or rod 18 may be rigidly mounted on the bracket for projection through alined openings in the bearing feet 15. Surrounding the shaft 18 are a pair of spacer sleeves 19 which provide seats for a pair of washers 20 between which is interposed a coil spring 21. Each washer is slightly larger than the sleeve 19 and bears against the adjacent foot 15 so that a longitudinal movement of the lower fifth wheel 14 in either direction, compresses the spring between one or the other of the feet 15 and a spacer sleeve 19, and the effects of shocks or thrusts, particularly at times of coupling and uncoupling, are thus materially reduced.

The bearing plate 14 is provided with a rearwardly extending slot 22 to receive a dependent king pin 23 carried in a bracket 24 by the fifth wheel 13, and which provides an axis about which the bearing elements rotate. To retain the king pin in the slot 22, use may be made of a retractible latch or plunger 25 slidable in a lateral way on the underside of the platform 14 against the tension of a coil spring 26. A hand lever 27 pivoted at 28 is provided with a forked extremity which engages a pin on the latch 25 to project the same against the spring 26. On the underside of the platform 14 there is preferably located an integral abutment lug or stop 28' with which the lever 27 may be engaged by manual manipulation of the lever to retract the latch, the lever being held in such engagement by the force of the spring 26. At its end, the plunger 25 is provided with a pair of divergently disposed camming surfaces 29 and 30, and when the latch is in retracted position the camming surface 30 remains in the path of the king pin, as is illustrated by the broken lines in Figure 3, so that as the king pin moves out of the slot 22 it engages the surface 30 and pushes the plunger out of its way, further compressing the spring and moving the lever 27 away from the stop 28', whereby the lever tends to drop below the plane of the stop so as to encounter no interference upon return movement of the latch 25 as the king pin clears the latch in its movement out of the slot 22. As a result, the latch automatically resets itself for the coupling operation which is also automatic in that the king pin on its movement into the slot 22 engages the camming surface 29 and shifts the plunger out of its way until it passes therebeyond, when the plunger again returns under the force of the spring 26.

Extending downwardly and rearwardly from the platform 24 are a pair of ramp members 31 and 32, suitably fastened at their forward extremities to the platform for movement therewith and secured at the rear to the frame, each by a stud 33 projecting through an elongated slot 34 which accommodates relative movement. The inner edges of the two ramp members converge and provide a flaring mouth for the slot 22, whereby to guide the king pin in the coupling operation and eliminate the need for extreme care when the tractor is backed under the elevated front end of the trailer.

The upper fifth wheel member 13 is pivotally mounted in the trailer frame by means of a transverse shaft 35 fixedly connected with the upper bearing element by a pair of spaced split eye or clamping brackets 36 with its opposite ends having pivotal bearing in brackets 37 carried by the tractor frame. To lend structural strength to the upper assembly, an annular ring 38 of substantially channel shape in cross section is mounted on the upper side of the bearing plate 13 at the margin thereof, and a pair of longitudinally extending bracing members 39 are located within the ring and secured at opposite ends thereto. The top and bottom flanges of the ring 38 provide abutments for a cam device 40 projecting between the flanges and serving when engaged with the flange to hold the upper fifth wheel 13 against tilting movement for a purpose hereinafter to be more fully referred to. The cam 40 is mounted on a rock shaft 41 having a bearing in a frame bracket 42 and carrying at its outer end a hand lever 43. At the outer end of the lever 43 is a retractible locking pin 44 engageable in either one of two openings in the adjacent trailer frame member located in given relation and intended to hold the cam 40 in either of one of two positions of adjustment. On the underside of the frame and forward of the fifth wheel there may be mounted a pair of skid plates having upwardly inclined noses 45 to assist the engagement and skidding of the upper fifth wheel on the ramps 31 and 32.

There is thus provided a fifth wheel construction in which the lower bearing element is non-tilting and the upper bearing element is hingedly mounted for swinging movement to accommodate angularity of the tractor and trailer units in a vertical plane. There are in use other constructions in which the upper bearing element is rigid witht he trailer frame and the lower fifth wheel is mounted for tilting movement. With this last mentioned construction the present fifth wheel elements are also usable. In the event that a tractor fifth wheel is hinged and it is desired to couple such tractor with a trailer having the upper fifth wheel heretofore described in detail, it is only necessary to actuate the cam 40 to bring its major axis into a vertical plane so that the cam engages with the two abutment surfaces provided by the flanges of the ring 38 whereupon the upper fifth wheel is equivalent to and forms the function of the non-tilting fifth wheel for which the mentioned tilting lower is designed. A coupling of this sort is illustrated in Figure 7, while in Figure 8 is illustrated the coupling of a non-tilting upper with the non-tilting lower fifth wheel of the present disclosure. In this later case, the convex upper surface of the platform 14 provides a rocking bearing surface which accommodates relative angular movements of the two units in the vertical plane.

We claim:

1. In a fifth wheel coupling between a supporting member and a supported member of an articulated vehicle train, a bearing plate, means to pivotally mount said plate on one of the members to accommodate its coupling with a non-tilting complementary plate and means to hold said plate immovable to accommodate its coupling with a tilting complementary plate.

2. In a semi-trailer adapted for detachable connection with a tractor, a fifth wheel bearing element, means to pivot said element on a transverse horizontal axis, a cam device movable into and out of engagement with said element and adapted when engaged to prevent tilting movement about the pivot means, and means to hold said cam in adjusted position.

3. In a semi-trailer, a frame, a fifth wheel pivotally mounted in the frame and provided with a pair of spaced abutments, an adjustable cam interposed between said abutments and adapted for movement into engagement therewith to lock the fifth wheel against movement, a rock shaft for said cam carried by and projected beyond the frame, a hand lever for actuating said shaft and a retractible plunger associated with said lever and frame to lock the lever in adjusted position.

4. A convertible fifth wheel construction for selective connection with complementary wheels of either the tilting or the non-tilting types in a tractor trailer organization, including a bearing element, means to mount said element for tilting movement throughout the period of its use with a non-tilting type complementary wheel, and means operable at will to hold the element against tilting movement for its use with a tilting type complementary wheel.

5. In a semi-trailer, a fifth wheel, means tiltably mounting the fifth wheel to adapt it for mating cooperative engagement with a complementary non-tilting fifth wheel, and mechanism operable at will to hold the tiltably mounted fifth wheel immovable so as to convert the same for use with a complementary tilting fifth wheel.

6. In a tractor-trailer combination, a detachable fifth wheel coupling including a non-rocking lower bearing element mounted on the tractor and provided with an open ended slot to receive a king pin, a convex bearing surface on said element for rocking engagement with a complementary pin carrying bearing element, an upper bearing element having a dependent king pin adapted for reception in said slot and means to close said slot to retain the pin therein.

7. In a tractor trailer organization, a fifth wheel bearing plate adapted for cooperative connection with a fifth wheel of either the rocking type or the non-rocking type, pivotal counting means rockably supporting said plate and an abutment movable from non-engaging relation with the plate when the plate is free to move about its pivotal mounting into engagement with the plate for holding the plate immovable.

HOWARD A. FLOGAUS.
W. G. RETZLAFF.